INVENTOR
Allan Chilton.
BY ATTORNEY

UNITED STATES PATENT OFFICE 2,396,232

ENGINE COOLING FAN

Allan Chilton, Ridgewood, N. J., assignor to Wright Aeronautical Corporation, a corporation of New York Application January 26, 1942, Serial No. 428,173

2 Claims. (Cl. 170—173)

This invention relates to blowers and is concerned particularly with improvements in cooling air blowers used in conjunction with air-cooled internal combustion engines.

In connection with radial cylinder air-cooled aircraft engines of large power, present design trends indicate the need for augmented cooling airflow. In this connection, it will be appreciated by those familiar with the art that a propeller is usually mounted upon a shaft extending from the engine nose and that the hub of the propeller is of considerable size and bulk. Usually the engine is housed in an embracing cowl having an axial air entrance opening immediately back of the propeller, the diameter of the opening being somewhat less than the diameter of the engine per se. The propeller is geared down from the engine crankshaft to rotate at a speed in the neighborhood of half of crankshaft speed. If a cooling air fan be installed in the cowling air entrance, behind the propeller, this fan should rotate at a speed considerably in excess of propeller speed and the pitched blades of the blower for greatest effectiveness, should bridge the radial gap from the edge of the cowl entrance to a rearward projection of the bulky portion of the propeller hub. Thus, the blower assembly may properly have a hub of about the same diameter as the propeller hub and the length of each blade will correspond roughly to about one-fifth of the diameter of the whole blower assembly. Provision should be made to speed up the cooling air blower from the propeller shaft by which it is driven and necessarily, the structure of the blower assembly must be such as to sustain the loads imposed thereon by centrifugal force and additionally the blower assembly must be of minimum weight and bulk, and should preferably be in vibration insulated relation with respect to the propeller and the engine crankshaft. If such vibration insulation is not utilized, vibration forcing impulses from the fan, from the propeller, or from the engine, may be resonant with the natural frequencies of some other part of the system.

An object of the invention is to provide a blower assembly and drive therefor to meet the above indicated requirements. A further object is to provide an axial flow blower rotor reinforced to sustain centrifugal loads. A further object of the invention is to provide an annular stress sustaining hub system having blower vanes extending radially outward therefrom which, when rotated at high speed, will, within itself, assume the stresses incident to centrifugal force. A further object is to provide an elastic support for a high speed blower rotor to avoid vibration transmission from the driving shaft to the blower assembly or vice versa. Still another object is to provide a speed increasing gear drive for a cooling air blower on an aircraft engine, which may be driven from an engine propeller shaft with a minimum of basic change in the engine structure.

Further objects of the invention will be noted in reading the annexed detailed description in connection with the drawings, in which.

Figure 3:
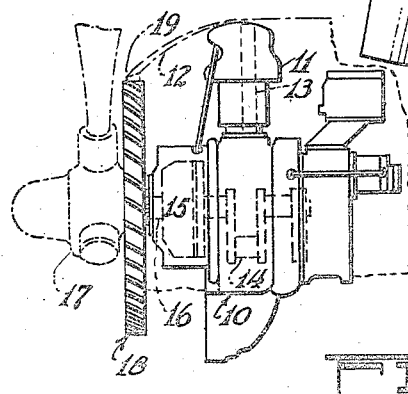
Fig. 3 is a small scale side elevation showing the application of the blower to an aircraft engine installation.

Referring first to Fig. 3, I show a conventional radial cylinder air-cooled aircraft engine 10 whose cylinders 11 are embraced by a cowling 12, the sector-shaped spaces between the engine cylinders being blocked by baffles 13 to confine cooling airflow through the engine disc to the finned surfaces of the cylinders 11. The pistons of the cylinders, not shown, drive a crankshaft 14 which is connected through a reduction gear 15 to a propeller shaft 16 which carries a propeller 17. Between the propeller and the engine nose is a cooling air blower 18 whose blades are substantially coplanar with the annular air entrance opening 19 defined by the front of the cowling 12.

Figure 1:
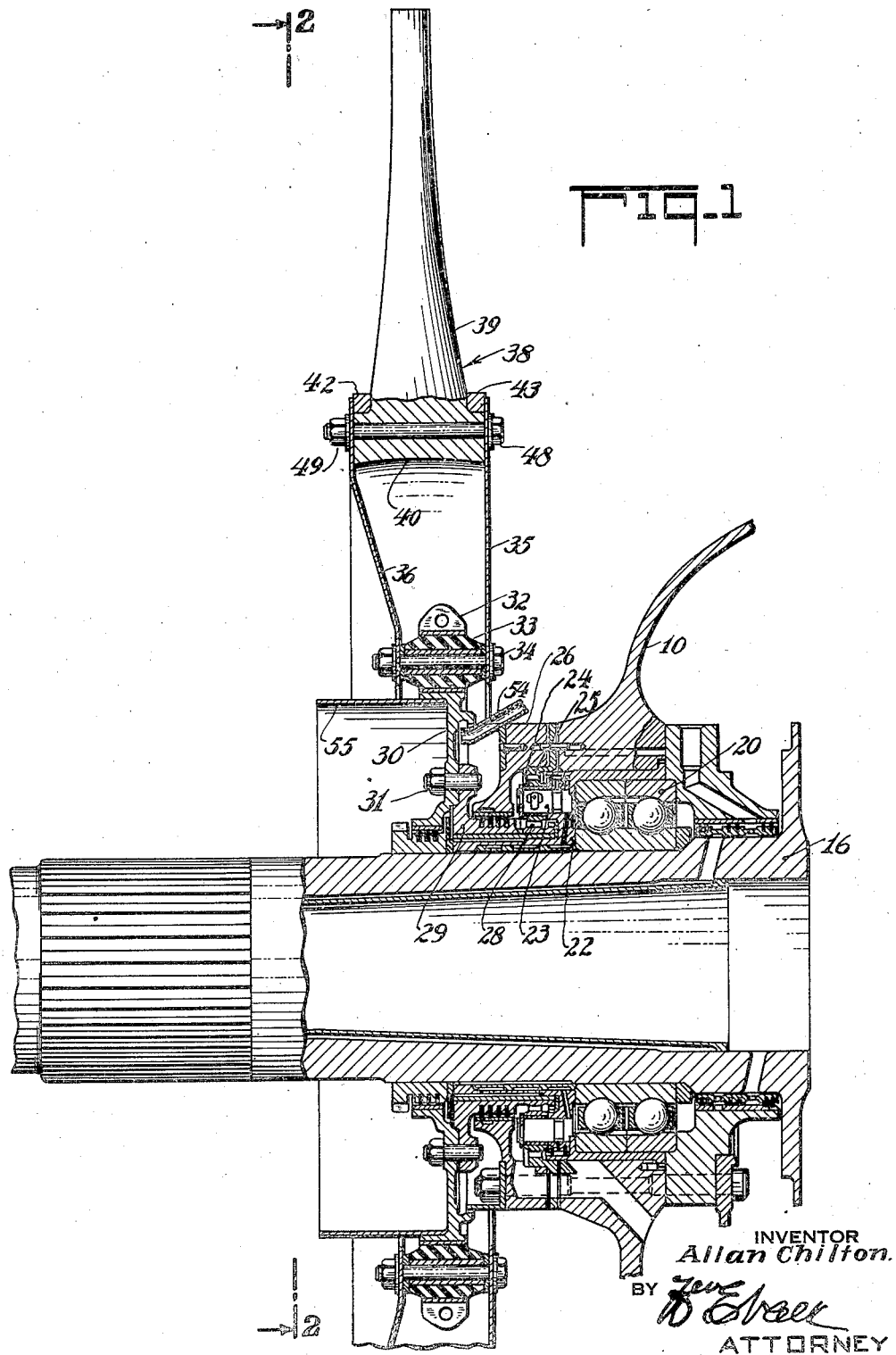
Fig. 1 is a fragmentary longitudinal section through a blower assembly according to the invention, as applied to the nose of a prime mover.
Figure 2:
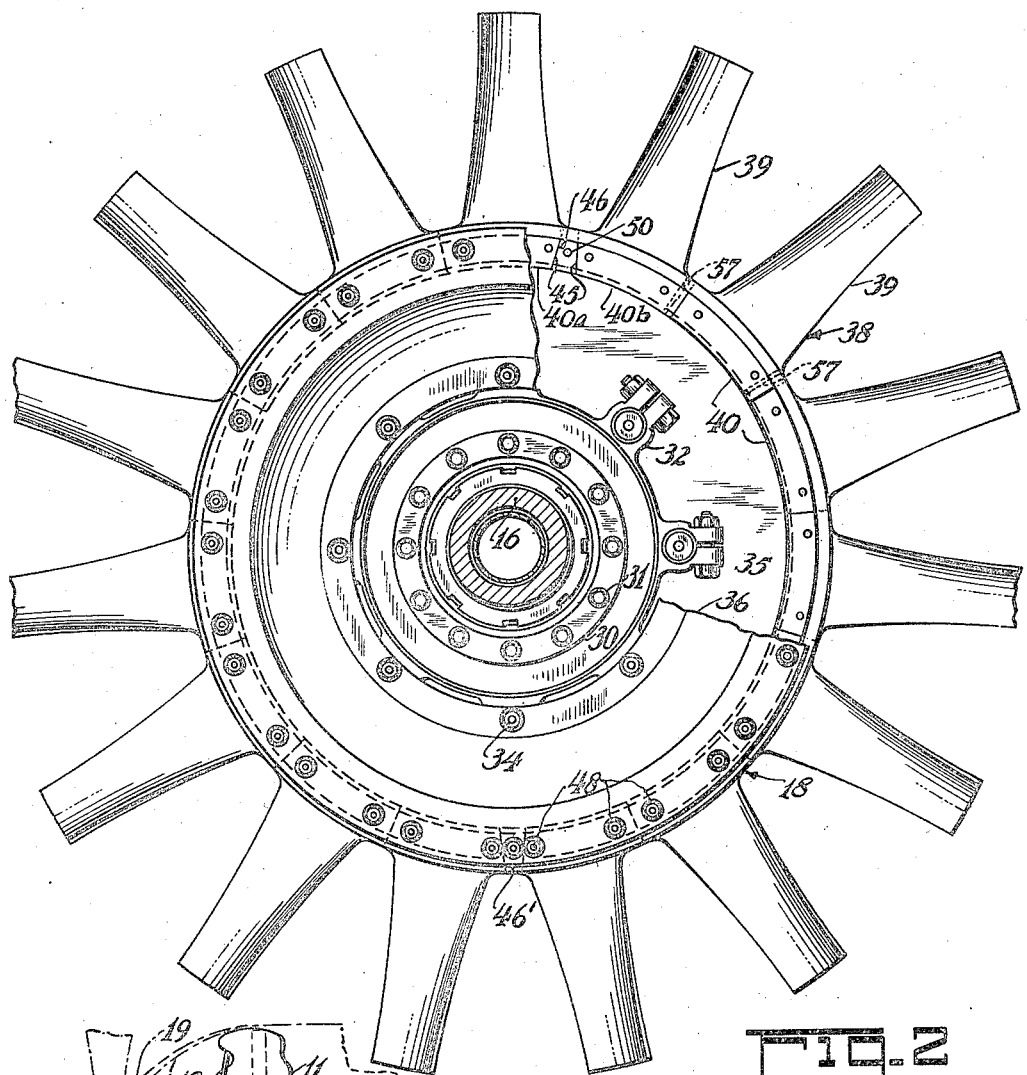
Fig. 2 is a view, partly broken away, on the line 2—2 of Fig. 1.

Reference may now be made to Figs. 1 and 2, wherein it will be seen that the propeller shaft 16 is carried in radial and thrust bearings 20 in the engine nose. Forward of the bearings 20, a spider 22 is secured to the shaft 16 which spider carries planet journals 23 on which planet pinions 24 are mounted. These pinions engage a ring gear 25 secured to the engine nose by a nose plate 26 and the pinions mesh also with a sun gear 28 integral with a sleeve 29 piloted through the hub of the spider 22 on the shaft 16. To a flange on the sleeve 29, an inner hub member 30 is bolted as at 31, this hub member having a plurality of bosses 32 spaced circumferentially therearound, these bosses having bores within which rubber bushings 33 are assembled. Through the holes of the rubber bushings, bolts 34 are passed to secure axially spaced annular plates 35 and 36 whose outside diameter is substantially the same as the diameter of the propeller hub 17.

The rubber bushings, which are a normal article of commerce, provide a vibration insulating mounting for the plates 35 and 36 upon the inner hub 30.

The outer portion of the blower assembly consists of a plurality of individual blade elements 38 each comprising a pitched blade 39 integral with a butt block 40 of segmental form. The several blocks 40 are assembled to comprise an annulus, as shown in Fig. 2, and axially spaced high strength bands 42 and 43 are placed around the several butt blocks, one across the front of the blades 39, and the other across the back of the blades 39. Two adjacent blocks such as 40a and 40b are formed with wedge faces 45 and a wedge block 46 is inserted between these surfaces, from the inside, and is forced radially outwardly, whereby the several butt blocks are forced into firm engagement with one another and also into firm engagement with the bands 42 and 43. The wedge 46 thus enables the blade elements 38 to be locked up with the bands 42 and 43 and this assembly may be handled as a unit structure.

This assembly is then installed between the two plates 35 and 36 and is attached thereto by a plurality of bolts 48 passing through the plate 35, the blocks 40, and the plate 36, the bolts being secured by nuts 49. Likewise, the wedge block 46 may be secured to the plates 35 and 36 by a bolt 50. More than one wedge block 46 may be used, if desired, and Fig. 2 shows a second block 46'. Also as illustrated the plates 35 and 36 overlap the sides of the bands 42 and 43 to hold these bands in place.

The blade elements 38 will be formed of a light material—either non-metallic or metallic, as desired. The bands 42 and 43 are preferably made from steel. The plates 35 and 36 which merely sustain torsional stresses incident to driving the blower, may be made of duralumin.

The planetary gear set comprised by the elements 22, 23, 24, 25, and 26 provides a step-up transmission of high capacity, due to the large number of pinions 24 which may be used, between the propeller shaft and the blower assembly so that the blower may be rotated at a speed considerably in excess of propeller shaft speed to gain greater blower effectiveness. This gearset, as is apparent in Fig. 1, is extremely compact and may be incorporated in existing power plants with a minimum of design changes in the basic engine assembly.

Fig. 1 also shows a de-icing fluid tube 54 adapted to feed fluid to the interior of a drum 55 which connects with additional apparatus carried by the propeller. These elements, however, are not germane to the invention.

Since the cavity between the plates 35 and 36 is open to the atmosphere adjacent the mounting boxes 32, vent holes 57 are drilled through the butt blocks 40 to allow centrifugal throw-off of any moisture or foreign matter which might accumulate in the cavity.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A fan comprising annular hub means and a fan blade assembly secured thereto, said assembly comprising a pair of axially spaced annular tension bands and a plurality of fan blade elements each having a butt-end portion and a blade portion extending outwardly therefrom between said pair of axially spaced annular tension bands, said butt-end portions being disposed in an annulus tightly embraced by said tension bands and in tight end-to-end relation with each other to provide a blade assembly adapted to be handled as a unit structure thereby facilitating its securement to said hub means, said hub means comprising a pair of axially spaced plate-like members secured to the sides of said annulus and overlapping the sides of said bands to help secure said bands against axial displacement, said plate-like members extending radially inward beyond the inner diameter of said annulus, and resilient means spaced radially inward of the inner diameter of said annulus for drivably connecting said plate-like members to driving means for said fan.

2. A fan comprising annular hub means and a fan blade assembly secured thereto, said assembly comprising a pair of axially spaced annular tension bands and a plurality of fan blade elements each having a butt-end portion and a blade portion extending outwardly therefrom between said pair of axially spaced annular tension bands, said butt-end portions being disposed in an annulus tightly embraced by said tension bands and in tight end-to-end relation with each other to provide a blade assembly adapted to be handled as a unit structure thereby facilitating its securement to said hub means, said hub means comprising a pair of axially spaced plate-like members secured to the sides of said annulus and overlapping the sides of said bands to help secure said bands against axial displacement, and means connecting said plate-like members to driving means for said fan.

ALLAN CHILTON.